United States Patent Office 2,972,628
Patented Feb. 21, 1961

2,972,628

METHOD FOR PREPARING O,O,S-TRIALKYL PHOSPHOROTHIOLOTHIONATES

Richard L. McConnell and Harry W. Coover, Jr., Kingsport, Tenn., assignors to Eastman Kodak Company, Rochester, N.Y., a corporation of New Jersey No Drawing. Filed Aug. 13, 1958, Ser. No. 754,725

6 Claims. (Cl. 260—461)

This invention relates to a new method for the preparation of organophosphorus compounds. In a specific aspect this invention relates to a new method for the preparation of O,O,S-trialkylphosphorothiolothionates.

Various methods have been described in the prior art for preparing thiophosphates but ordinarily chlorine-containing intermediates have been used in the preparation of these compounds. Another procedure for preparing these compounds is described in U.S. 2,622,095 and in that process phosphorus pentasulfide is employed as one of the starting materials. In accordance with this invention we have found that O,O,S-trialkyl phosphorothiolothionates can be prepared by the reaction of a dialkyl phosphorothiolothionate with an orthoester. The following equation illustrates the reaction that takes place in practicing our invention.

(RO)$_2$P(S)SH + R'C(OR")$_3$
→ (RO)$_2$P(S)SR" + R"OH + R'COOR"

wherein R is an alkyl radical containing 1-8 carbon atoms, R' is selected from the group consisting of hydrogen, lower alkyl containing 1-4 carbon atoms and phenyl and R" is an alkyl radical containing from 1-8 carbon atoms.

In the practice of our invention one of the reactants can be added to the other reactant and the preferred procedure involves the gradual addition of the second reactant with stirring. Thus, the orthoester can be added gradually to the dialkyl phosphorothiolothionate, but if desired, the reverse procedure of addition of reactants can be used. Normally it is desirable to employ a reactor provided with adequate means of agitation, and since the reaction is quite exothermic, it is also desirable to employ a reactor that is provided with adequate cooling means.

The operable temperature range for the reaction is generally from −25° C. to 250° C. and the preferred temperature range is from 25 to 200° C. The reaction time usually varies from 1–8 hours, but in some instances longer and shorter reaction periods can be used. Normally it is unnecessary to employ a catalyst for the reaction since the dialkyl phosphorothiolothionate will react with the orthoesters in the absence of a catalyst.

Ordinarily it is not necessary to employ a solvent for the reaction, but in some instances solvents are desirable. Among the solvents that can be used are the normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. In general it is preferable to carry out the reaction using equal molar quantities of the reactants. However, it is within the scope of our invention to carry out the reaction using any molar ratio of reactants.

The following examples are illustrative of the process employed in the practice of our invention.

*Example 1.—O,O,S-triethyl phosphorothiolothionate*

(C$_2$H$_5$O)$_2$P(S)SC$_2$H$_5$

Diethyl phosphorothiolothionate (0.1 mole) and triethyl orthoformate (0.1 mole) were mixed with stirring. The reaction is exothermic and the temperature of the reaction mixture rose to 55° C. When the exothermic nature of the reaction had subsided, the reaction mixture was heated on the steam bath with stirring for three hours. During this time, ethanol which was liberated during the reaction refluxed at a head temperature of 78° C. Distillation of the crude product in vacuo through a 6" Vigreux column gave the following fractions:

| Fraction | B.P., ° C./Pressure | Weight of Fraction, g. | $n_D^{20}$ |
|---|---|---|---|
| A | 55–73/0.7 mm | 2.0 | 1.4902 |
| B | 73–76/0.7 mm | 14.4 | 1.5040 |
| C | Residue | 2.9 | 1.5210 |

Fraction B is O,O,S-triethyl phosphorothiolothionate and represents a 67.3% yield. The infrared spectrum of fraction B is identical with that of an authentic sample of (C$_2$H$_5$O)$_2$P(S)SC$_2$H$_5$. Analysis calculated for C$_6$H$_{15}$O$_2$PS$_2$: C, 33.63; H, 7.06; P, 14.46. Found: C, 33.54; H, 7.06; P, 14.39.

Infrared analysis on material collected in the Dry Ice trap during the distillation indicated the presence of ethanol and ethyl formate.

*Example 2.—O,O,S-triethyl phosphorothiolothionate*

(C$_2$H$_5$O)$_2$P(S)SC$_2$H$_5$

Diethyl phosphorothiolothionate (0.08 mole) and triethyl orthoacetate (0.08 mole) were reacted according to the procedure of Example 1. Distillation of the crude product gave an 82.5% yield of product, B.P. 65–71°/0.6 mm., $n_D^{20}$ 1.5040. The infrared spectrum of this material was identical with that obtained on fraction B of Example 1. By-products from this reaction were ethanol and ethyl acetate.

*Example 3.—O,O-diethyl S-propyl phosphorothiolothionate*

(C$_2$H$_5$O)$_2$P(S)SC$_3$H$_7$

Diethyl phosphorothiolothionate (0.1 mole) and tripropyl orthoformate (0.1 mole) were reacted according to the procedure of Example 1. Fractionation of the crude product resulted in isolation of a 76% yield of (C$_2$H$_5$O)$_2$P(S)SC$_3$H$_7$

*Example 4.—O,O-diethyl S-(2-ethylhexyl) phosphorothiolothionate*

(C$_2$H$_5$O)$_2$P(S)SCH$_2$CHC$_4$H$_9$
                              |
                              C$_2$H$_5$

Diethyl phosphorothiolothionate (0.1 mole) and tris(2-ethylhexyl) orthoformate (0.1 mole) were reacted according to the procedure of Example 1. The product distilled at 125–130°/0.5 mm.

*Example 5.—S-ethyl O,O-diisobutyl phosphorothiolothionate*

[(CH$_3$)$_2$CHCH$_2$O]$_2$P(S)SC$_2$H$_5$

Diisobutyl phosphorothiolothionate (0.1 mole) and triethyl orthopropionate (0.1 mole) were reacted according to the procedure of Example 1 to produce

[(CH$_3$)$_2$CHCH$_2$O]$_2$P(S)SC$_2$H$_5$

*Example 6.—S-ethyl O,O-dipropyl phosphorothiolothionate*

$$(C_3H_7O)_2P(S)SC_2H_5$$

Dipropyl phosphorothiolothionate (0.1 mole) and triethyl orthobenzoate (0.1 mole) were reacted according to the procedure of Example 1 to produce $$(C_3H_7O)_2P(S)SC_2H_5$$

*Example 7.—O,O-bis(2-ethylhexyl) S-ethyl phosphorothiolothionate*

$$[C_4H_9CH(C_2H_5)CH_2O]_2P(S)SC_2H_5$$

Bis(2-ethylhexyl) phosphorothiolothionate (0.1 mole) and ethyl orthoformate (0.1 mole) were reacted according to the procedure of Example 1 to produce $$[C_4H_9CH(C_2H_5)CH_2O]_2P(S)SC_2H_5$$

This invention has been described in detail with particular reference to preferred embodiments thereof, but it will be understood that variations and modifications can be effected within the spirit and scope of the invention as described above and as defined in the appended claims.

I claim:
1. The process for producing O,O,S-trialkylphosphorothiolothionates which comprises reacting a dialkyl phosphorothiolothionate with an orthoester having the formula:

$$RC(OR')_3$$

wherein R is selected from the group consisting of hydrogen, lower alkyl and phenyl and R' is an alkyl radical containing from 1–8 carbon atoms at a temperature within the range of −25° C. to 250° C.
2. The method for producing O,O,S-triethylphosphorothiolothionate which comprises reacting diethylphosphorothiolothionate with triethylorthoformate at a temperature within the range of −25° C. to 250° C.
3. The method for producing O,O-diethyl S-propyl phosphorothiolothionate which comprises reacting diethyl phosphorothiolothionate with tripropyl orthoformate at a temperature within the range of −25° C. to 250° C.
4. The method for producing O,O-diethyl S-(2-ethylhexyl) phosphorothiolothionate which comprises reacting diethyl phosphorothiolothionate with tris(2-ethylhexyl) orthoformate at a temperature within the range of −25° C. to 250° C.
5. The method for producing S-ethyl O,O-diisobutyl phosphorothiolothionate which comprises reacting diisobutyl phosphorothiolothionate with triethyl orthopropionate at a temperature within the range of −25° C. to 250° C.
6. The method for producing S-ethyl O,O-dipropyl phosphorothiolothionate which comprises reacting dipropyl phosphorothiolothionate with triethyl orthobenzoate at a temperature within the range of −25° C. to 250° C.

References Cited in the file of this patent

UNITED STATES PATENTS 2,622,095    Brannock    Dec. 16, 1952

OTHER REFERENCES

Wiley et al.: J. Am. Chem. Soc. 71, 2899–2900 (1949).

Brannock et al.: J. Am. Chem. Soc. 73, 4953–4954 (1951).

Kosolapoff: Organo-Phosphorus Compounds, 220–221 (1950), John Wiley & Sons, New York.